(12) United States Patent
Reshef et al.

(10) Patent No.: US 11,973,689 B2
(45) Date of Patent: Apr. 30, 2024

(54) USER-CONFIGURABLE DATA PRIORITIZATION

(71) Applicant: Intel Corporation, Santa Clara, CA (US)

(72) Inventors: Ehud Reshef, Qiryat Tivon (IL); Carlos Cordeiro, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 329 days.

(21) Appl. No.: 17/347,626

(22) Filed: Jun. 15, 2021

(65) Prior Publication Data

US 2022/0060421 A1    Feb. 24, 2022

Related U.S. Application Data

(60) Provisional application No. 63/068,418, filed on Aug. 21, 2020.

(51) Int. Cl.
*H04L 47/24* (2022.01)

(52) U.S. Cl.
CPC .................................. *H04L 47/24* (2013.01)

(58) Field of Classification Search
CPC . H04L 47/24; H04L 47/2408; H04L 47/2416; H04L 47/2425; H04L 47/2433; H04L 47/2441; H04L 47/245; H04L 47/2458; H04L 47/2466; H04L 47/2475; H04L 47/2483; H04L 47/2491

See application file for complete search history.

(56) References Cited

U.S. PATENT DOCUMENTS

| | | | |
|---|---|---|---|
| 2002/0010772 A1* | 1/2002 | Kusano | H04L 47/805 709/240 |
| 2009/0290565 A1* | 11/2009 | Mangetsu | H04W 40/00 370/338 |
| 2017/0099672 A1* | 4/2017 | Tränk | H04W 76/50 |

* cited by examiner

*Primary Examiner* — Ian N Moore
*Assistant Examiner* — Brian T Le
(74) *Attorney, Agent, or Firm* — VIERING, JENTSCHURA & PARTNER mbB

(57) ABSTRACT

A processor may control a transmitter to send a first signal representing a request for one or more priority rules for data packet prioritization; to receive a second signal in response to the first signal, the second signal representing the one or more priority rules for data packet prioritization, and to receive a third signal representing a data packet including a header and a data payload. The header may comprise a first priority tag representing a first priority level. The processor may be configured to determine from the data payload and the one or more rules for data packet prioritization a second priority tag representing a second priority level and to replace the first priority tag with the second priority tag.

18 Claims, 6 Drawing Sheets

USER-CONFIGURABLE DATA PRIORITIZATION

CROSS-REFERENCE TO RELATED APPLICATIONS

This application claims priority to U.S. Provisional Application 63/068,418, filed on Aug. 21, 2020, the entirety of which is incorporated herein by reference in its entirety.

TECHNICAL FIELD

Various embodiments relate generally to a user-configurable data prioritization device and method for same.

BACKGROUND

Data traffic from applications may be assigned a variety of priority tags (e.g., Quality of Service (QoS) designations). These priority tags may be, for example, encoded in a data packet header as one or more priority designations, which may indicate a type of data associated with the data packet and/or a priority with which the data should be processed. In some cases, application vendors do not utilize these priority designations, and therefore these applications' data packets may be sent without a meaningful priority designation or a meaningful differentiation between priorities of the applications' packets and priorities of other packets. In other cases, routers and/or switches between sender and destination overwrite priority tags (e.g., overwrite a QoS indicator, overwrite a Differentiated Services Cope Point (DSCP) field) in packets traversing the network, thereby yielding packets without a meaningful priority designation. In other cases, even if the application/server QoS had previously tagged the traffic (e.g. using Institute of Electrical and Electronics Engineers (IEEE) Standard P802.1p/DSCP), the QoS tagging may often be stripped from the packets or overwritten due to "Internet neutrality" rules or commercial considerations. In other cases, organizations may desire to override such settings to prioritize enterprise-validated applications versus other applications. For example, specifically in the case of enterprises, organizations may seek to prioritize traffic from an enterprise select voice over internet protocol (VoIP) application over a non-preferred VoIP application, even though both applications tag their traffic as high priority Voice or Video traffic. Given the above, there is a need to be able to prioritize/re-prioritize QoS tag values within homes and enterprises.

BRIEF DESCRIPTION OF THE DRAWINGS

Throughout the drawings, it should be noted that like reference numbers are used to depict the same or similar elements, features, and structures. The drawings are not necessarily to scale, emphasis instead generally being placed upon illustrating aspects of the disclosure. In the following description, some aspects of the disclosure are described with reference to the following drawings, in which.

DESCRIPTION

Figure 1A:
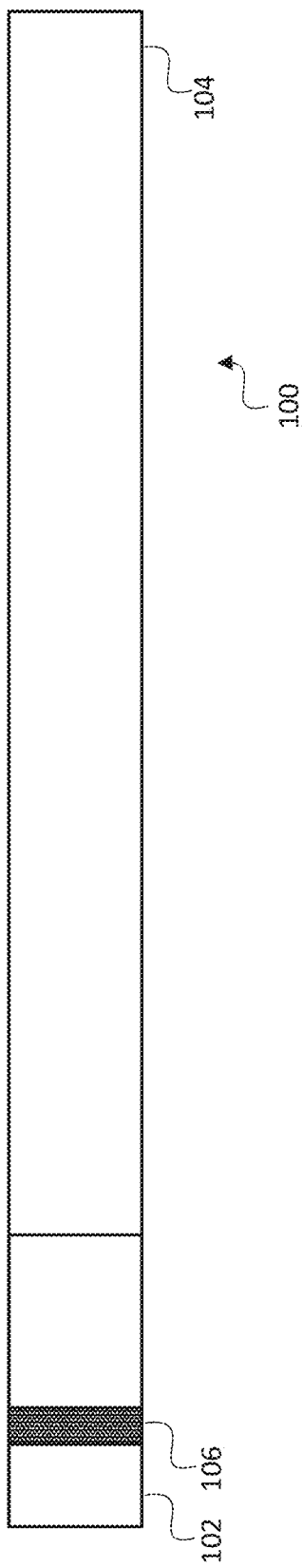
FIGS. 1A and 1B depict exemplary concepts of priority within Internet packets.

The following detailed description refers to the accompanying drawings that show, by way of illustration, specific details and aspects in which the disclosure may be practiced. These aspects are described in sufficient detail to enable those skilled in the art to practice the disclosure. Other aspects may be utilized and structural, logical, and electrical changes may be made without departing from the scope of the disclosure. The various aspects are not necessarily mutually exclusive, as some aspects can be combined with one or more other aspects to form new aspects. Various aspects are described in connection with methods and various aspects are described in connection with devices. However, it may be understood that aspects described in connection with methods may similarly apply to the devices, and vice versa.

The word "exemplary" is used herein to mean "serving as an example, instance, or illustration." Any embodiment or design described herein as "exemplary" is not necessarily to be construed as preferred or advantageous over other embodiments or designs.

Throughout the drawings, it should be noted that like reference numbers are used to depict the same or similar elements, features, and structures.

The terms "at least one" and "one or more" may be understood to include a numerical quantity greater than or equal to one (e.g., one, two, three, four, [ . . . ], etc.). The term "a plurality" may be understood to include a numerical quantity greater than or equal to two (e.g., two, three, four, five, [ . . . ], etc.).

The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of listed elements.

The words "plural" and "multiple" in the description and the claims expressly refer to a quantity greater than one. Accordingly, any phrases explicitly invoking the aforementioned words (e.g. "a plurality of [objects]", "multiple [objects]") referring to a quantity of objects expressly refers more than one of the said objects. The terms "group (of)", "set [of]", "collection (of)", "series (of)", "sequence (of)", "grouping (of)", etc., and the like in the description and in the claims, if any, refer to a quantity equal to or greater than one, i.e. one or more. The terms "proper subset", "reduced subset", and "lesser subset" refer to a subset of a set that is not equal to the set, i.e. a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term data, however, is not limited to the aforementioned examples and may take various forms and represent any information as understood in the art.

The term "processor" or "controller" as, for example, used herein may be understood as any kind of entity that allows handling data, signals, etc. The data, signals, etc. may be handled according to one or more specific functions executed by the processor or controller.

A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "system" (e.g., a drive system, a position detection system, etc.) detailed herein may be understood as a set of interacting elements, the elements may be, by way of example and not of limitation, one or more mechanical components, one or more electrical components, one or more instructions (e.g., encoded in storage media), one or more controllers, etc.

A "circuit" as user herein is understood as any kind of logic-implementing entity, which may include special-purpose hardware or a processor executing software. A circuit may thus be an analog circuit, digital circuit, mixed-signal circuit, logic circuit, processor, microprocessor, Central Processing Unit ("CPU"), Graphics Processing Unit ("GPU"), Digital Signal Processor ("DSP"), FPGA, integrated circuit, ASIC, etc., or any combination thereof. Any other kind of implementation of the respective functions which will be described below in further detail may also be understood as a "circuit." It is understood that any two (or more) of the circuits detailed herein may be realized as a single circuit with substantially equivalent functionality, and conversely that any single circuit detailed herein may be realized as two (or more) separate circuits with substantially equivalent functionality. Additionally, references to a "circuit" may refer to two or more circuits that collectively form a single circuit.

As used herein, "memory" may be understood as a non-transitory computer-readable medium in which data or information can be stored for retrieval. References to "memory" included herein may thus be understood as referring to volatile or non-volatile memory, including random access memory ("RAM"), read-only memory ("ROM"), flash memory, solid-state storage, magnetic tape, hard disk drive, optical drive, etc., or any combination thereof. Furthermore, it is appreciated that registers, shift registers, processor registers, data buffers, etc., are also embraced herein by the term memory. It is appreciated that a single component referred to as "memory" or "a memory" may be composed of more than one different type of memory, and thus may refer to a collective component including one or more types of memory. It is readily understood that any single memory component may be separated into multiple collectively equivalent memory components, and vice versa. Furthermore, while memory may be depicted as separate from one or more other components (such as in the drawings), it is understood that memory may be integrated within another component, such as on a common integrated chip.

Figure 1B:
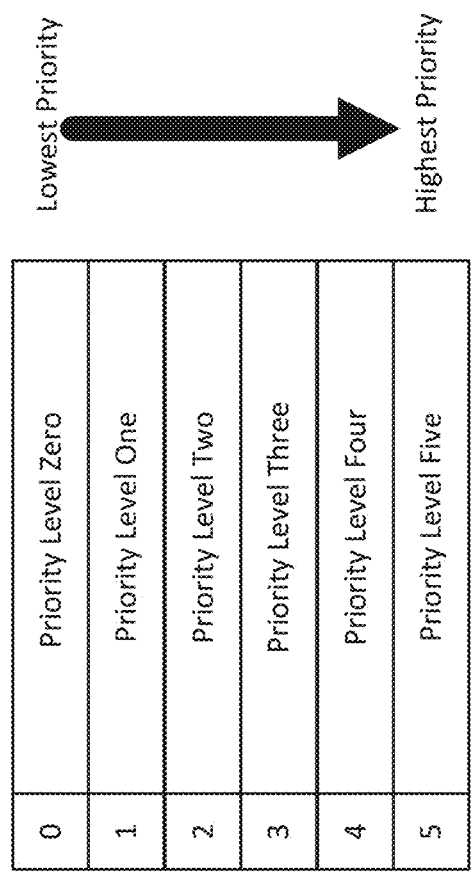

Internet data may be conventionally transmitted as one or more data packets. These data packets may be transmitted, for example, according to Internet Protocol (IP) (e.g., an IP as released by the Internet Engineering Task Force (IETF)). FIGS. 1A and 1B depict concepts of priority within Internet packets. In FIG. 1A, a representation of an Internet packet 100 is shown, said Internet packet including a packet header 102 and a packet payload 104. The packet header 102 may include a variety of information about the packet and packet payload, including, but not limited to, a packet source identifier, a packet destination identifier, a packet length, a header length, a protocol version for transmission of the packet, a packet priority, and otherwise. Of note, one or more bits within the packet header may include a designation of a packet priority 106, e.g. designated in a packet priority field. That is, one or more bits of the packet header 102 may denote any of a plurality of possible packet priorities. A computing device (e.g., a client device) may utilize these packet priorities to prioritize one data packet over another. FIG. 1B depicts a demonstrative representation of packet priority levels. In this example, six packet priority levels are available, ranging from Priority Level Zero (lowest priority) to Priority Level Five (highest priority). Various priority level schemes are available, including, but not limited to, Type of Service (ToS), DSCP, or otherwise. The packet priorities may be generally referred to as QoS. These examples, which are provided for demonstrative purposes, notwithstanding, this list of priority schemes is not intended to be exhaustive, and the principles and methods described herein may be utilized with any priority scheme.

The priorities may represent a priority of a data packet over another data packet. For example, some data packets are latency tolerant compared to other data packets. More specifically, single documents or images (e.g., word processing documents, single images, administrative files, etc.) may be transmitted with long delays or latencies, whereas real-time video may be significantly less latency tolerant, and real-time audio may be still less latency tolerant than real-time video. Otherwise stated, user experience may be minimally impacted by a delay in transmission of certain materials (e.g., archive materials, personal files), whereas delays in other data transmissions (e.g., real-time video and/or real-time audio) may result in jitter, pauses, or may otherwise significantly impair the user experience. In many instances, streaming voice may be particularly latency intolerant, as even short pauses in voice reproduction and/or jitter can significantly diminish user experience and/or render the voice data unusable. The above explanation related to latency tolerance is only one example of a rationale to prioritize data; as described in greater detail herein, it may be desirable to prioritize data based on a variety of rationales, whether related to latency-tolerance or otherwise. Non-limiting examples of other rationales to prioritize data may include a desire to prioritize data of certain applications (e.g., trusted applications, organization critical applications, etc.), a desire to prioritize data of certain senders and/or certain intended recipients, a desire to prioritize certain data types, or otherwise.

Internet communication may essentially include a request for information by a first device, followed by a response with the requested information by a second device. The responding device may transmit the requested information within Internet packets, as described above, wherein the data for said packets originate or are stored in one or more remote servers. When one of the one or more remote servers creates a packet for transmission, the one or more servers may encode a priority level within the packet header, as depicted within FIGS. 1A and 1B. The receiving client device may utilize this priority information to prioritize data within the packet payload. As explained above, the one or more servers may generate the packet without a meaningful priority designation (e.g., no priority designation or designating all packets as low-priority or "best effort"), or the priority designation may be removed from the packet (e.g., replaced by a low-priority designation or "best effort") while en route to the recipient.

Figure 2:
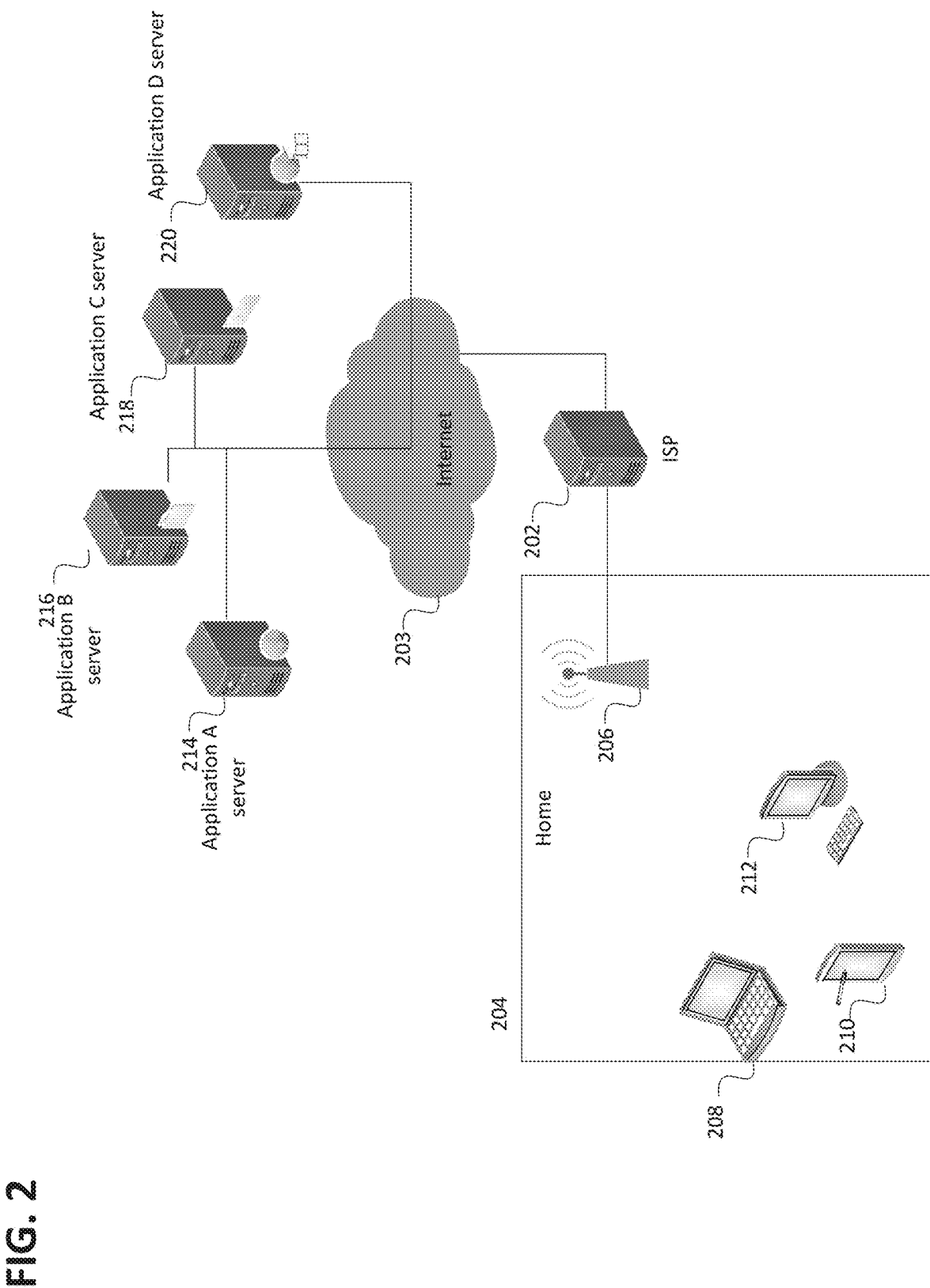
FIG. 2 depicts a priority level determination according to one or more distributed priority rules according to a first aspect of the disclosure.

FIG. 2 depicts a priority level determination according to one or more distributed priority rules according to a first aspect of the disclosure. In this configuration, an Internet service provider (ISP) 202 provides Internet service to a home environment 204, which reaches various client devices within the home through an Internet access point 206. The access point may be, for example, a Wi-Fi router, an internal LAN, or any other device or system to provide data from the ISP 202 to one or more client devices. In this case, the one or more client devices are exemplarily depicted as including a laptop computer 208, a tablet computer or smartphone 210, and a desktop computer 212. These specific client device implementations are provided for demonstrative purposes only and are not intended to be limiting; rather, any client device or devices capable of receiving Internet data from an access point 206 may be used. The ISP 202 may generally receive Internet data 203, said data originating or being stored on any number of different servers. In common practice, the one or more client devices within the home environment 204 may utilize a plurality of different applications, wherein many or all of the applications utilize data originating on different servers. In this example, four application servers are depicted, wherein Application A Server 214 exemplarily includes reference data (e.g., a library, an online encyclopedia, or other reference material), Application B Server 216 exemplarily includes personal archival data (e.g., personal documents, archived documents, etc.), Application C Server 218 exemplarily includes email data, and Application D Server 220 exemplarily includes media content data. The application servers may be configured, for example, as stand-alone servers or as virtual machines that are deployed on one or more physical servers. In the normal course of usage, one or more of the client devices (208, 210, and 212) may establish a connection with the Internet access point 206, said connection including various requests for data and data packages, such as, for example, by using one or more forms of the IP. In this manner, the one or more client devices (208, 210, 212) may send a request for data from an application server (e.g., Application A Server 214), said request being sent to the Internet access point 206, and subsequently relayed from the Internet access point 206 to the ISP 202, and onward to the Application A Server 214. In response, the Application A Server 214 may provide requested data in the form of one or more packets (e.g., an Internet data packet including a header and payload), said one or more packets being sent to the ISP 202, relayed to the Internet access point 206, and provided to the requesting client device. Although this is described in a downlink format, this series of transmissions may occur in an essentially reverse direction, wherein an application server requests data from a client device, and the client device sends the requested data to the application server in response.

According to another aspect of the disclosure, the elements of FIG. 2 can be modified to designate a client device (e.g., a dedicated personal computer (PC) in the home) as a "Configurator PC", said Configurator PC being used for the specific home network. With respect to FIG. 2, and merely for demonstrative purposes, the PC 212 may be the Configurator PC. This Configurator PC may set and/or manage the priority rules as described herein. The Configurator PC may be configured to run one or more dedicated home network optimization applications, which may provide a home network manager (e.g., an administrator for the home network) with a user interface to define prioritized applications and services for the home network. That is, the home network manager may utilize the home network application(s) on the Configurator PC to select one or more priorities, said priorities may be implemented according to any aspect described herein, including, but not limited to, priority based on application, priority based on application type, priority based on sender, priority based on intended recipient, priority based on data type, or any combination thereof. For example, the home network manager may define one or more business critical applications as being high-priority applications and/or one or more other applications as being low-priority applications. The home network manager may define one or more latency intolerant games as being high-priority applications. By prioritizing data packets in this manner via the one or more dedicated home network optimization applications, the network manager may create priority rules. These priority rules, which may be saved on the Configurator PC, may be distributed to the various client devices within the local network. In so doing, the network manager creates priority rules for prioritizing data packets as described throughout herein.

Figure 3:
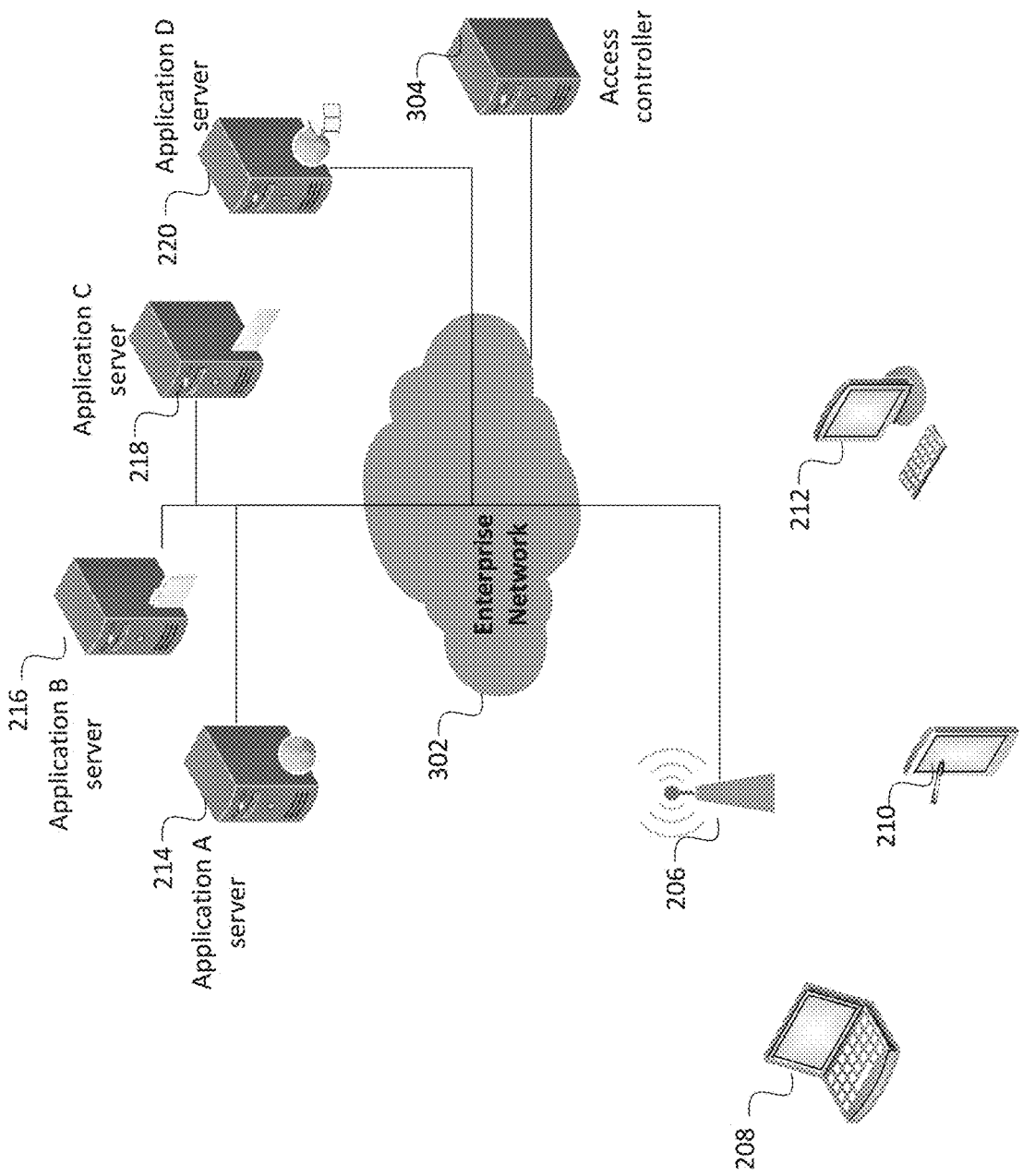
FIG. 3 depicts a priority level determination according to one or more distributed priority rules according to a second aspect of the disclosure.

FIG. 3 depicts a priority level determination according to one or more distributed priority rules according to a second aspect of the disclosure. For brevity, common elements between FIG. 2 and FIG. 3 have been numbered identically, and said descriptions of these common elements are made by reference to FIG. 2 and will not be explicitly repeated herein. In this configuration, an Enterprise Network 302 provides for data exchange with an Internet access point 206. An access controller 304 controls permissions to the Enterprise Network 302 and various aspects of data exchange between, for example, the Enterprise Network 302 and the access point 302. In the normal course of usage, one or more of the client devices (208, 210, and 212) may establish a connection with the Internet access point 206, said connection including various requests for data and data packages, such as, for example, by using one or more forms of IP. These requests may include requests for data from the Enterprise Network 302; alternatively or additionally, these requests may include one or more requests for data from any other external servers, such as the application services A-D (214 through 220). If one or more of the requests include a request for information from an external server, said requests may be directed from the access point 206 to the Enterprise Network 302 and onward (optionally over one or more intermediaries) to the intended external server; alternatively, the requests may be directed from the access point and toward the intended server while circumventing the Enterprise Network 302 (e.g., the access point communicates directly with an ISP). That is, settings obtained from the Enterprise Network as described herein may be applied to other data stored on the Enterprise Network 302 that is then received from the Enterprise Network 302; internet traffic received from the Enterprise Network 302; internet traffic received from another source, said internet traffic not having passed through the Enterprise Server; or any combination thereof.

Regardless of the configuration, whether as depicted in FIG. 2 (e.g., home configuration), FIG. 3 (e.g., Enterprise configuration), or otherwise, it may be desirable to prioritize data from one application over data from another application. For example, it may be hypothetically desirable to prioritize Application D data over Application C data, which is prioritized over Application B data. As described in greater detail herein, this prioritization may occur based on data latency tolerance, preferred applications, priority of sender, priority of intended recipient, any combination thereof, or otherwise.

As described in FIGS. 1A and 1B, strategies currently exist to assign priorities to Internet traffic data. The strategies may be commonly employed, such that application servers generating data for Internet transmission may commonly generate Internet header packets including a priority tag such as, for example, a QoS indicator. Similarly, many software applications are designed to generate outgoing data packets with priority tags representing a priority level of the data within the package's data payload.

Despite the existence of a system for prioritizing Internet data transmissions, said priority tags (e.g. tag priority levels within a header of a data packet) are commonly unavailable to end-users. For example, due to net-neutrality laws, Internet service providers may be required to remove priority tags from Internet packet data. That is, even if an Internet packet with a priority tag is received, an Internet service provider may be required to remove the priority tag before it can be further transmitted to an end-user or to overwrite the priority tag in the packet's header with a neutral or low-level priority (e.g., a "best method" priority). For example, for an Internet packet having a priority tag of 5 (e.g., as depicted in FIG. 1B), the Internet service provider may replace the priority tag with a priority tag of 0, thus effectively eliminating the priority information. Said removal of priority information may not be limited to removal based on net-neutrality laws, but rather for any reason whatsoever. For example, certain application servers may privately contract with one or more Internet service providers to achieve a higher priority level of their data as compared to data of their competitors.

Whatever the reason for a removal of priority information, the result is that end-users may receive Internet data packets having no priority information, reduced or omitted priority information, no differentiation of priorities of various data packets, reduced or omitted differentiation of priorities of various data packets, or any of these, which may not be applicable or useful to the end-users. For example, data packets corresponding to real-time voice messages may have the same priority level as data packages corresponding to broadcast video, which may have the same priority as data packages corresponding to data that may otherwise be low priority data. This may potentially result in data being processed without a clear priority, which may potentially result in undesirable latencies, or otherwise negatively affect use or user experience.

Although it may theoretically be possible for a user to program certain devices (e.g. an access point) to prioritize received data, these procedures can be cumbersome and seldom implemented. Instead, it may be desired to implement one or more priority rules, which may be stored on one or more devices to which a user device connects (e.g. access point, enterprise server, etc.). Upon establishing a connection, the user device may receive the one or more priority rules from the device, thereby permitting the user device to prioritize received Internet traffic data according to the one or more priority rules. In implementations in which a plurality of user devices are used, each of the plurality of user devices may receive the same set of priority rules, thereby permitting consistent implementation of priority rules among a plurality of devices. This permits a home or enterprise (or any other type of network) to implement a set of rules once and then have those rules broadly and essentially automatically applied across the network. Specific procedures of performing this prioritization according to the one or more priority rules are now described in greater detail.

According to a first aspect of the disclosure, the priority procedure described herein may be implemented in an Enterprise scenario, such as in a scenario as depicted in FIG. 3. In this configuration, the Enterprise access controller may function as a natural single point of configuration, for which one or more administrators may define a set of priority rules to prioritize traffic for enterprise applications. For example, the one or more administrators may define priority rules to increase a priority level of data packets corresponding to data that require (or are best processed according to) enhanced QoS levels. In these instances, the client device may query the access controller (e.g., based on one or more standards or vendor specific Application Programming Interfaces (APIs)) for the one or more priority rules (e.g., QoS policy) so that it may set its internal priority settings (e.g., its internal QoS policy) to comply with the Enterprise priority rules, as implemented in the access controller. In response, the access controller may deliver to the client device the one or more priority rules. The client device may then implement the one or more priority rules by prioritizing received data packets according to the one or more priority rules received from the access controller. For example, and according to an aspect of the disclosure, the client device may modify a priority tag in a header of one or more received data packets to reflect a modified priority based on the one or more priority rules.

It is recognized that a variety of installations may be possible for an Enterprise server. In the Microsoft Windows OS environment, the one or more processors may implement the one or more priority rules using the Group Policy. Group Policy may be understood as a feature of various Microsoft Windows operating systems, which controls account working environments. Using Group Policy, administrators may centrally manage and/or configure operating systems, applications, and user-settings.

In Linux based systems, the one or more priority rules can be by applying suitable parameters to iptables. For Linux systems, iptables is a utility program that may permit a system administrator to configure IP packet filter rules.

Figure 4:
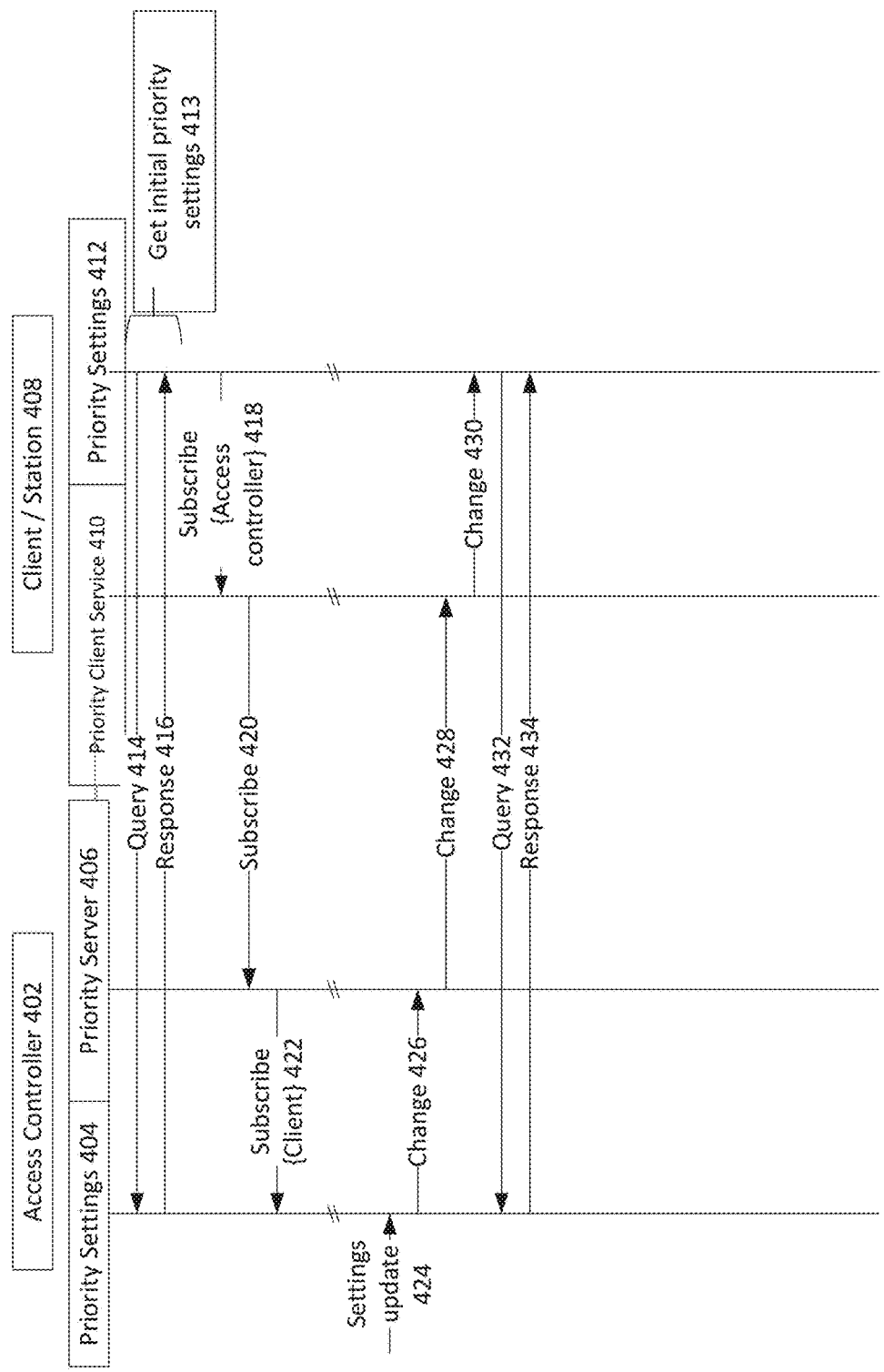
FIG. 4 depicts a communication protocol between an access controller and a client or station according to an aspect of the disclosure.

FIG. 4 depicts a communication protocol between an access controller and a client or station in a message flow diagram according to an aspect of the disclosure. In these communications, the access controller 402 may include a priority settings module 404 and a priority server 406. The client/station 408 may include a priority client service module 410 and a priority settings module 412. It is noted that these designations are primarily provided for demonstrative purposes. They may reflect separate physical entities (e.g., distinct processors, distinct physical modules) or distinct logical levels and/or application levels of the access controller 402 and the client/station 408.

The communication may begin by obtaining initial priority settings 413. To achieve this, the client/station 408 may send a query 414 to the Access Controller's Priority Settings Module 404 via the Client/Station's Priority Settings Module 412. The Priority Settings Module 404 may then send a response 416 including one or more priority rules. The client/station 408 may then implement the one or more priority rules to prioritize data packets as described herein.

According to an aspect of the disclosure, the client/station 408 may subscribe to the access controller 402 for notifications of changes in the one or more priority rules. In this manner, the client/station 408 may send a request via the Priority Settings Module 412 to the Priority Client Service Module 410 to subscribe to priority settings from the access controller 418. The Priority Client Service Module may send a subscription request 420 to the Priority Server 406, which may send a client subscription request 422 to the Priority Settings Manager 404.

In the event that the one or more priority rules (e.g. priority settings within the access controller are changed) are updated 424 within the access controller 402, the Priority Settings Module 404 may send a change notification 426 to the Priority Server 406, which may in turn send a change notification 428 to the Priority Client Service Manager 410, which may in turn send a change notification 430 to the Priority Settings Module 412. In receiving the change notification 430, the Priority Settings module 412 may become aware that the one or more priority rules for the access controller 402 have been changed. In order to obtain the one or more priority rules from the access controller 402, the client/station 408 may send, via the QoS Settings Module 412 a query 432 to the Priority Settings Manager 404, which may respond 434 with one or more updated priority rules. The principles and methods disclosed herein with result to the communication in FIG. 4 may be applied at least between one or more client devices and an access point (e.g., a home scenario or in a non-enterprise business scenario); between one or more client devices and an access controller of an Enterprise Server; between one or more client devices and a PC Configurator; any combination of these; or otherwise.

Figure 5:
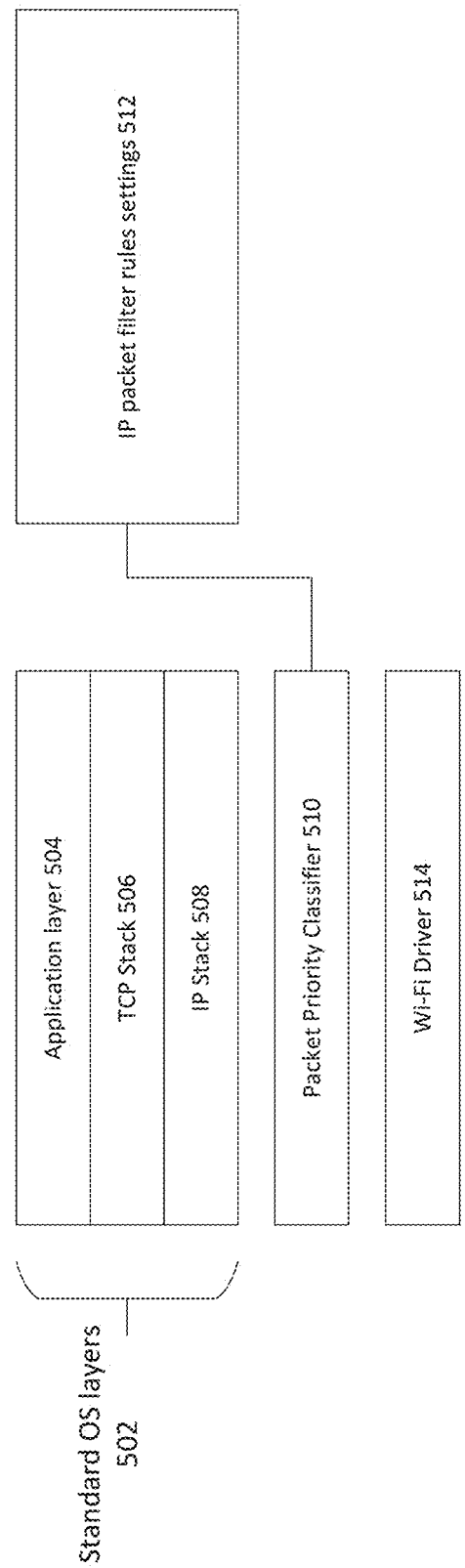
FIG. 5 depicts a machine learning implementation, according to an aspect of the disclosure.

FIG. 5 depicts a machine learning implementation, according to an aspect of the disclosure. One or more machine learning modules may generate one or more priority rules. The machine learning module may be implemented in any device without limitation, including, but not limited to, a PC in the home environment (e.g. the Configurator PC), an enterprise server, an access point, or otherwise. The machine learning module may include standard OS layers 502 such as an application layer 504, a Transmission Control Protocol stack 506, and an Internet Protocol stack 508. The machine learning module may further include a Packet Priority Classifier 510, configured to determine a packet priority, and optionally a Wi-Fi Driver 514. For data packets sent or received, the machine learning module may analyze packet information to determine one or more priority rules. Packet information which may be analyzed by the machine learning module includes, but is not limited to, IP destination address, packet size, packets priority settings (e.g. Differentiated Services Code Point (DSCP) settings), packet time (e.g., OS timer), or any combination thereof.

Based on the packet information considered, the machine learning module may determine priority information for one or more data packets. That is, the machine learning module may determine a targeted packet priority. The machine learning module may determine one or more priority rules. The machine learning module may cause modified or updated priority rules to be stored in one or more files of an enterprise server, such as in Windows Group Policy or Linux iptables. In determining the one or more priority rules, the machine learning module may consider any of a user prioritization of one or more packets, a user input as to a satisfaction of user experience, a latency tolerance of a packet, or otherwise.

Figure 6:
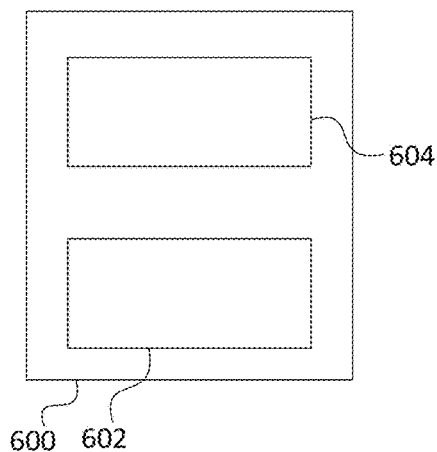
FIG. 6 depicts a user device, according to an aspect of the disclosure.

FIG. 6 depicts a user device 600, according to an aspect of the disclosure. The user device 600 may include one or more processors 602 configured to: control a transmitter 604 to send a first signal representing a request for one or more priority rules for data packet prioritization; receive a second signal in response to the first signal, the second signal representing the one or more priority rules for data packet prioritization; receive a third signal representing a data packet including a header and a data payload, wherein the header further includes a first priority tag representing a first priority level; determine from the data payload and the one or more rules for data packet prioritization a second priority tag representing a second priority level; and replace the first priority tag with the second priority tag.

In addition or in combination with any of the features of this or the preceding paragraph, the instructions may be further configured to cause the one or more processors to store the data packet with the second priority tag. In addition or in combination with any of the features of this or the preceding paragraph, the one or more priority rules for data packet prioritization may include criteria to assign one of a plurality of priority levels to a data packet based on an attribute of the data payload. In addition or in combination with any of the features of this or the preceding paragraph, the one or more priority rules for data packet prioritization may include one or more application-specific priority levels, and determining the second priority tag may include determining an application corresponding to the data packet and determining the second priority tag from the one or more application-specific priority levels based on the determined application. In addition or in combination with any of the features of this or the preceding paragraph, the one or more priority rules for data packet prioritization may include one or more data-type-specific priority levels; and determining the second priority tag may include determining data type of the data payload and determining the second priority tag from the one or more application-specific priority levels based on the determined data type. In addition or in combination with any of the features of this or the preceding paragraph, determining the data type may include identifying a data payload of the data packet as including critical application data, video data, voice data, internetwork control data, or network control data. In addition or in combination with any of the features of this or the preceding paragraph, the one or more priority rules for data packet prioritization may include one or more sender-specific priority levels; and determining the second priority tag includes determining a sender of the data packet and determining the second priority tag from the one or more sender-specific priority levels based on the determined sender. In addition or in combination with any of the features of this or the preceding paragraph, the one or more priority rules for data packet prioritization may include one or more destination-specific priority levels; and determining the second priority tag may include determining a sender of the data packet and determining the second priority tag from the one or more destination-specific priority levels based on the determined destination. In addition or in combination with any of the features of this or the preceding paragraph, the one or more priority rules for data packet prioritization may include one or more IP-Address-specific priority levels; and determining the second priority tag may include determining an IP-Address from which the data packet was sent and determining the second priority tag from the one or more IP-Addressspecific priority levels based on the determined IP-Address from which the data packet was sent. In addition or in combination with any of the features of this or the preceding paragraph, the one or more priority rules for data packet prioritization may be rules to apply a Quality of Service level to the data packet. In addition or in combination with any of the features of this or the preceding paragraph, determining the second priority tag may include selecting a Quality of Service identifier for the data packet according to the one or more priority rules for data packet prioritization. In addition or in combination with any of the features of this or the preceding paragraph, the one or more priority rules for data packet prioritization may be rules to apply a Quality of Service level to the data packet based on an application associated with the data payload. In addition or in combination with any of the features of this or the preceding paragraph, the one or more priority rules for data packet prioritization may be rules to apply a Quality of Service level to the data packet based on a data type of the data payload. In addition or in combination with any of the features of this or the preceding paragraph, the one or more priority rules for data packet prioritization may be rules to apply a Quality of Service level to the data packet based on a sender of the data payload. In addition or in combination with any of the features of this or the preceding paragraph, the data packet may be a data packet according to Internet Protocol (IP). In addition or in combination with any of the features of this or the preceding paragraph, the instructions may be further configured to cause the one or more processors to receive the signal representing the one or more priority rules from a wireless access point. In addition or in combination with any of the features of this or the preceding paragraph, the instructions may be further configured to cause the one or more processors to receive the signal representing the one or more priority rules from an Enterprise access controller. In addition or in combination with any of the features of this or the preceding paragraph, the instructions may be further configured, when executed, to cause the one or more processors to periodically send a request signal representing a renewed request for the one or more priority rules. In addition or in combination with any of the features of this or the preceding paragraph, determining the second priority tag may include assigning the data packet a priority that is greater than or less than a priority of one or more additional data packets.

Figure 7:
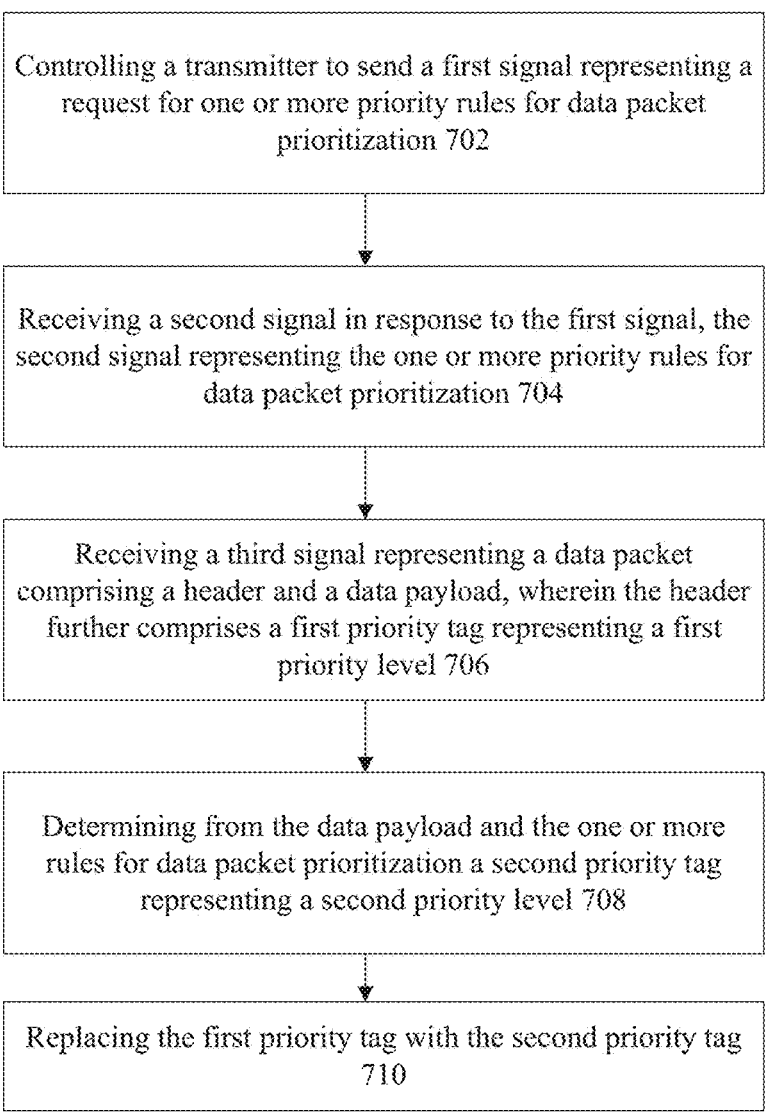
FIG. 7 depicts a method of priority rule distribution.

FIG. 7 depicts a method of priority rule distribution, including controlling a transmitter to send a first signal representing a request for one or more priority rules for data packet prioritization 702; receiving a second signal in response to the first signal, the second signal representing the one or more priority rules for data packet prioritization 704; receiving a third signal representing a data packet including a header and a data payload, wherein the header further includes a first priority tag representing a first priority level 706; determining from the data payload and the one or more rules for data packet prioritization a second priority tag representing a second priority level 708; and replacing the first priority tag with the second priority tag 710.

According to an aspect of the disclosure, one or more client devices may be configured to periodically perform dynamic query of the access controller for a change in the priority rules. For example, the one or more client devices may send messages to the access controller to request updates to priority rules. Such dynamic queries may include periodic requests (e.g. repeated requests at a fixed interval), requests following predefined events (e.g. requests upon opening a program, closing a program, establishing a wireless link, receiving a data package, sending a data package, etc.), user-initiated requests (e.g. a user causes the request to be sent), program-initiated requests (e.g. a software program causes the request to be sent), or any of these. In the event that the priority rules are changed between queries, the one or more client devices may receive an updated version of the priority rules in response to the next query. In this manner, the priority rules may be updated across an enterprise of virtually any size, and the client devices within the enterprise may be expected to receive updated priority rules shortly after an update is implemented.

According to an aspect of the disclosure, the one or more client devices may be configured to subscribe to a notice of change in the server policies (e.g., pub-sub model). In this manner, the one or more client devices may be configured to issue a server query for an updated set of priority rules upon receiving such notice of change in the server policies.

Within a home environment, at least two implementations may be possible. In a first home-implementation, and according to an aspect of the disclosure, the one or more priority rules may be stored on a home-gateway (e.g., access point). This may be achieved through direct home-gateway administration, such as via an HTML connection between a client device and the home-gateway, via an app for this purpose, and/or via one or more device management protocols (e.g. TR-69) for ISP routers.

In this manner, the one or more client devices may periodically query the home-gateway for a change in the priority policies. In the event that a priority policy is changed, the home-gateway may send the client device a copy of the modified priority policies in response to the query. Alternatively or additionally, and depending on the home-gateway, it may be possible for the one or more client devices to subscribe to a notice of change within the home-gateway policies, such that the one or more client devices receive a notification whenever the home-gateway priority policies are changed. In this manner, and in response to the notification, the one or more client devices may request and receive an updated version of the priority policies.

In some instances, and according to another aspect of the disclosure, the network optimization application(s) may also interface with a filter driver with machine learning based traffic analytics to recommend to the user a set of applications that could benefit from prioritization. Once these applications are defined, the Configurator PC may set its own priority rules using existing priority rules, the filter-driver option, or existing options on the device. Furthermore, the Configurator PC may send (e.g., transmit according to an IP, push, or otherwise) the one or more priority rules to the home router.

According to another aspect of the disclosure, one or more applications may collect information about a user experience of the priority system described herein. For example, the Configurator PC may also run a user experience application, which may be configured to obtain information about applications used within the home environment and user preferences with respect to application priority. The user experience application may alternatively or additionally operate on one or more client devices. The user experience application may obtain the above information at least through observation of user application usage, observation of data traffic within the home network, directly through user questionnaires, or any combination thereof.

According to an aspect of the disclosure, the one or more client devices may be configured to modify the priority tag according to the priority rules. The client's modification of the priority tag may include replacing a priority tag with a modified priority tag according to the one or more priority rules. Further, if the client device replaces the received priority tag with a modified priority tag, the client device may store the data packets (or any portions thereof) with the modified data tag. Alternatively or additionally, the client device may prioritize the received data packets according to the one or more priority rules and process or store the data packets according to the new priority without storing the data packet with the modified priority tag in the header.

The one or more priority rules may include criteria to assign one of a plurality of priority levels to the data packet based on an attribute of the data payload. One or more processors (e.g. one or more processors in the client device) may determine a type of data within the data payload and may determine a priority tag based on the determined type of data and criteria for the determined type of data according to the one or more priority rules. For example, the one or more processors may determine that the data payload includes real-time voice data, and the one or more priority rules may indicate that real-time voice data should receive the highest priority level. Accordingly, the one or more processors may assign a highest priority level to the packet with the data payload that includes real-time voice data. This process may be applied to any data type using criteria within the priority rules.

Alternatively or additionally, the one or more processors may assign a priority to packet data based on a sender of the packet data or a intended recipient of the packet data. With respect to assignment of packet priority based on a sender, senders of data may be closely associated with data type or data priority. For example, it may be desired to assign a high priority to data from a favorite streaming data provider. The sender ID may be used as a proxy for streaming data. That is, it may be assumed that data received from a sender ID associated with the favorite streaming data provider is streaming data or data that should otherwise receive a high priority. Similarly, and by way of further example, it may be assumed that all data from a sender ID that is associated with a conventional cloud storage platform (e.g. and for demonstrative purposes only, a platform in which a user stores digital copies of documents or other low priority information) should receive a comparatively low priority. In this manner, the one or more priority rules may include priority assignments based on sender ID. According to one aspect of the disclosure, the one or more priority rules may include a list of one or more sender IDs and an associated priority level, or receive rules for the assignment of associated priority levels, for each of the one or more sender IDs.

Similarly, the priority rules may include one or more priority designations based on intended recipient ID. In this manner, an administrator, home network manager, or user may configure the one or more priority rules to prioritize data for one recipient over another recipient. For example, it may be desired that data intended for one or more persons within an enterprise be assigned a higher priority than data for one or more other persons within an enterprise. Alternatively or additionally, it may be desired to more highly prioritize data for one or more devices compared to data for one or more other devices. In this manner, the one or more priority rules may include one or more recipient IDs and associated priority levels or rules for the associated priority levels, as desired.

The one or more priority rules may include one or more application-specific priority levels. It may be desired to prioritize data for one or more applications over data for one or more other applications. For example, it may be assumed that packet data for a real-time voice chat application should be given a high priority, whereas data for an application that merely displays text may be given a lower priority. In this way, the one or more priority rules may be configured to more highly prioritize data for certain applications over other data from other applications. The one or more priority rules may be configured with a list of one or more applications and priorities for data packets corresponding to the one or more applications, or priority rules to prioritize data packets based on their corresponding application.

The one or more processors may be configured to determine a data type of the data packet and to prioritize the packet data in accordance with the one or more priority rules in based on the determined data type. For example, and for demonstrative purposes only, the one or more processors may be configured to determine whether a data packet represents critical application data, video data, voice data, internet control data, or network control data. Based on this determination, the one or more processors may be configured to determine a priority level for the packet data, based on the one or more priority rules. In this manner, the one or more priority rules may include a list of packet data types and associated priority levels for each of the packet data types, and/or rules for determining a priority level based on the determined packet data type.

A variety of protocols exists for data transfer, and these protocols may utilize a variety of priority levels. For example, it is known to include in a data packet header a Type of Service (ToS), such as a ToS according to Internet Protocol version 4. It is also known to categorize Internet packet data based on a Differentiated Services designation, such as a differentiated services code point (DSCP) or a differentiated services field (DS Field). Other designations for QoS are known. The one or more priority rules described herein may be tailored to any one or more protocols for reflecting a priority level, without limitation. That is, assuming that received packet data includes no meaningful differentiation between packet priorities (e.g., the packet priorities are removed by the ISP), users may tailor the one or more priority rules to cause the one or more processors to recategorize the priority according to any priority protocol. Similarly, even if priority differentiations are included within the Internet packets, the one or more priority rules may be configured to recategorize the priority irrespective of the priority attributed to the packets upon receipt. The one or more priority rules are not limited to assigning priority based on a known priority protocol, as described above, but may also be tailored to assign priority according to any desired implementation.

The one or more processors of a client device may be configured to send a request to another device for the one or more priority rules. That is, the one or more priority rules may be stored on a separate device such as, but not limited to, an enterprise server, an access point, and/or a Configurator PC. The one or more processors of the client device may receive a signal representing the one or more priority rules in response to the request for the one or more priority rules. The client device may store the received priority rules for processing and prioritization of received data packets according to the methods and principles described herein.

The one or more processors may be configured to periodically send a request signal representing a renewed request for the one or more priority rules. That is, the one or more processors may be configured to send a request for updated priority rules after a predefined time duration, or upon a predefined event transpiring (e.g. a new boot-up, loading of an application, etc.).

The methods and principles described herein may be performed by one or more devices (e.g. client devices, personal computers, etc.). They may be performed as one or more methods and/or may be performed by one or more non-transitory computer readable media, including instructions which, if executed, would cause one or more processors to perform the methods described herein.

Further aspects of the disclosure are disclosed by the following examples:

In Example 1, a non-transitory computer readable medium, including instructions that, when executed, are configured to cause one or more processors to: control a transmitter to send a first signal representing a request for one or more priority rules for data packet prioritization; receive a second signal in response to the first signal, the second signal representing the one or more priority rules for data packet prioritization; receive a third signal representing a data packet including a header and a data payload, wherein the header further includes a first priority tag representing a first priority level; determine from the data payload and the one or more rules for data packet prioritization a second priority tag representing a second priority level; and replace the first priority tag with the second priority tag.

In Example 2, the non-transitory computer readable medium of example 1, wherein the instructions, when executed, are further configured to cause the one or more processors to store the data packet with the second priority tag.

In Example 3, the non-transitory computer readable medium of example 1 or 2, wherein the one or more priority rules for data packet prioritization include criteria to assign one of a plurality of priority levels to a data packet based on an attribute of the data payload.

In Example 4, the non-transitory computer readable medium of any one of examples 1 to 3, wherein the one or more priority rules for data packet prioritization include one or more application-specific priority levels; and wherein determining the second priority tag includes determining an application corresponding to the data packet and determining the second priority tag from the one or more application-specific priority levels based on the determined application.

In Example 5, the non-transitory computer readable medium of any one of examples 1 to 4, wherein the one or more priority rules for data packet prioritization include one or more data-type-specific priority levels; and wherein determining the second priority tag includes determining data type of the data payload and determining the second priority tag from the one or more application-specific priority levels based on the determined data type.

In Example 6, the non-transitory computer readable medium of example 5, wherein determining the data type includes identifying a data payload of the data packet as including critical application data, video data, voice data, internetwork control data, or network control data.

In Example 7, the non-transitory computer readable medium of any one of examples 1 to 6, wherein the one or more priority rules for data packet prioritization include one or more sender-specific priority levels; and wherein determining the second priority tag includes determining a sender of the data packet and determining the second priority tag from the one or more sender-specific priority levels based on the determined sender.

In Example 8, the non-transitory computer readable medium of any one of examples 1 to 7, wherein the one or more priority rules for data packet prioritization include one or more destination-specific priority levels; and wherein determining the second priority tag includes determining a sender of the data packet and determining the second priority tag from the one or more destination-specific priority levels based on the determined destination.

In Example 9, the non-transitory computer readable medium of any one of examples 1 to 8, wherein the one or more priority rules for data packet prioritization include one or more IP-Address-specific priority levels; and wherein determining the second priority tag includes determining an IP-Address from which the data packet was sent and determining the second priority tag from the one or more IP-Address-specific priority levels based on the determined IP-Address from which the data packet was sent.

In Example 10, the non-transitory computer readable medium of any one of examples 1 to 9, wherein the one or more priority rules for data packet prioritization are rules to apply a Quality of Service level to the data packet.

In Example 11, the non-transitory computer readable medium of any one of examples 1 to 10, wherein determining the second priority tag includes selecting a Quality of Service identifier for the data packet according to the one or more priority rules for data packet prioritization.

In Example 12, the non-transitory computer readable medium of any one of examples 1 to 11, wherein the one or more priority rules for data packet prioritization are rules to apply a Quality of Service level to the data packet based on an application associated with the data payload.

In Example 13, the non-transitory computer readable medium of any one of examples 1 to 12, wherein the one or more priority rules for data packet prioritization are rules to apply a Quality of Service level to the data packet based on a data type of the data payload.

In Example 14, the non-transitory computer readable medium of any one of examples 1 to 12, wherein the one or more priority rules for data packet prioritization are rules to apply a Quality of Service level to the data packet based on a sender of the data payload.

In Example 15, the non-transitory computer readable medium of any one of examples 1 to 14, wherein the data packet is a data packet according to Internet Protocol (IP).

In Example 16, the non-transitory computer readable medium of any one of examples 1 to 15, wherein the instructions are further configured, when executed, to cause the one or more processors to receive the signal representing the one or more priority rules from a wireless access point.

In Example 17, the non-transitory computer readable medium of any one of examples 1 to 16, wherein the instructions are further configured, when executed, to cause the one or more processors to receive the signal representing the one or more priority rules from an Enterprise access controller.

In Example 18, the non-transitory computer readable medium of any one of examples 1 to 17, wherein the instructions are further configured, when executed, to cause the one or more processors to periodically send a request signal representing a renewed request for the one or more priority rules.

In Example 19, the non-transitory computer readable medium of any one of examples 1 to 18, wherein determining the second priority tag includes assigning the data packet a priority that is greater than or less than a priority of one or more additional data packets.

In Example 20, a user device, including one or more processors configured to: control a transmitter to send a first signal representing a request for one or more priority rules for data packet prioritization; receive a second signal in response to the first signal, the second signal representing the one or more priority rules for data packet prioritization; receive a third signal representing a data packet including a header and a data payload, wherein the header further includes a first priority tag representing a first priority level; determine from the data payload and the one or more rules for data packet prioritization a second priority tag representing a second priority level; and replace the first priority tag with the second priority tag.

In Example 21, the user device of example 20, wherein the one or more processors are further configured to store the data packet with the second priority tag.

In Example 22, the user device of example 20 or 21, wherein the one or more priority rules for data packet prioritization include criteria to assign one of a plurality of priority levels to a data packet based on an attribute of the data payload.

In Example 23, the user device of any one of examples 20 to 22, wherein the one or more priority rules for data packet prioritization include one or more application-specific priority levels; and wherein determining the second priority tag includes determining an application corresponding to the data packet and determining the second priority tag from the one or more application-specific priority levels based on the determined application.

In Example 24, the user device of any one of examples 20 to 23, wherein the one or more priority rules for data packet prioritization include one or more data-type-specific priority levels; and wherein determining the second priority tag includes determining data type of the data payload and determining the second priority tag from the one or more application-specific priority levels based on the determined data type.

In Example 25, the user device of example 24, wherein determining the data type includes identifying a data payload of the data packet as including critical application data, video data, voice data, internetwork control data, or network control data.

In Example 26, the user device of any one of examples 20 to 25, wherein the one or more priority rules for data packet prioritization include one or more sender-specific priority levels; and wherein determining the second priority tag includes determining a sender of the data packet and determining the second priority tag from the one or more sender-specific priority levels based on the determined sender.

In Example 27, the user device of any one of examples 20 to 26, wherein the one or more priority rules for data packet prioritization include one or more IP-Address-specific priority levels; and wherein determining the second priority tag includes determining an IP-Address from which the data packet was sent and determining the second priority tag from the one or more IP-Address-specific priority levels based on the determined IP-Address from which the data packet was sent.

In Example 28, the user device of any one of examples 20 to 27, wherein the one or more priority rules for data packet prioritization are rules to apply a Quality of Service level to the data packet.

In Example 29, the user device of any one of examples 20 to 28, wherein determining the second priority tag includes selecting a Quality of Service identifier for the data packet according to the one or more priority rules for data packet prioritization.

In Example 30, the user device of any one of examples 20 to 29, wherein the one or more priority rules for data packet prioritization are rules to apply a Quality of Service level to the data packet based on an application associated with the data payload.

In Example 31, the user device of any one of examples 20 to 30, wherein the one or more priority rules for data packet prioritization are rules to apply a Quality of Service level to the data packet based on a data type of the data payload.

In Example 32, the user device of any one of examples 20 to 31, wherein the one or more priority rules for data packet prioritization are rules to apply a Quality of Service level to the data packet based on a sender of the data payload.

In Example 33, the user device of any one of examples 20 to 32, wherein the data packet is a data packet according to Internet Protocol (IP).

In Example 34, the user device of any one of examples 20 to 33, wherein the device is configured to receive the signal representing the one or more priority rules from a wireless access point.

In Example 35, the user device of any one of examples 20 to 34, wherein the device is configured to receive the signal representing the one or more priority rules from an Enterprise access controller.

In Example 36, the user device of any one of examples 20 to 35, wherein the one or more processors are further configured to periodically send a request signal representing a renewed request for the one or more priority rules.

In Example 37, the user device of any one of examples 20 to 36, wherein determining the second priority tag includes assigning the data packet a priority that is greater than or less than a priority of one or more additional data packets.

In Example 38, a method of prioritizing data, including: controlling a transmitter to send a first signal representing a request for one or more priority rules for data packet prioritization; receiving a second signal in response to the first signal, the second signal representing the one or more priority rules for data packet prioritization; receiving a third signal representing a data packet including a header and a data payload, wherein the header further includes a first priority tag representing a first priority level; determining from the data payload and the one or more rules for data packet prioritization a second priority tag representing a second priority level; and replacing the first priority tag with the second priority tag.

In Example 39, the method of example 1, further including storing the data packet with the second priority tag.

In Example 40, the method of example 38 or 39, wherein the one or more priority rules for data packet prioritization include criteria to assign one of a plurality of priority levels to a data packet based on an attribute of the data payload.

In Example 41, the method of any one of examples 38 to 40, wherein the one or more priority rules for data packet prioritization include one or more application-specific priority levels; and wherein determining the second priority tag includes determining an application corresponding to the data packet and determining the second priority tag from the one or more application-specific priority levels based on the determined application.

In Example 42, the method of any one of examples 38 to 41, wherein the one or more priority rules for data packet prioritization include one or more data-type-specific priority levels; and wherein determining the second priority tag includes determining data type of the data payload and determining the second priority tag from the one or more application-specific priority levels based on the determined data type.

In Example 43, the method of example 42, wherein determining the data type includes identifying a data payload of the data packet as including critical application data, video data, voice data, internetwork control data, or network control data.

In Example 44, the method of any one of examples 38 to 43, wherein the one or more priority rules for data packet prioritization include one or more sender-specific priority levels; and wherein determining the second priority tag includes determining a sender of the data packet and determining the second priority tag from the one or more sender-specific priority levels based on the determined sender.

In Example 45, the method of any one of examples 38 to 44, wherein the one or more priority rules for data packet prioritization include one or more destination-specific priority levels; and wherein determining the second priority tag includes determining a sender of the data packet and determining the second priority tag from the one or more destination-specific priority levels based on the determined destination.

In Example 46, the method of any one of examples 38 to 45, wherein the one or more priority rules for data packet prioritization include one or more IP-Address-specific priority levels; and wherein determining the second priority tag includes determining an IP-Address from which the data packet was sent and determining the second priority tag from the one or more IP-Address-specific priority levels based on the determined IP-Address from which the data packet was sent.

In Example 47, the method of any one of examples 38 to 46, wherein the one or more priority rules for data packet prioritization are rules to apply a Quality of Service level to the data packet.

In Example 48, the method of any one of examples 38 to 47, wherein determining the second priority tag includes selecting a Quality of Service identifier for the data packet according to the one or more priority rules for data packet prioritization.

In Example 49, the method of any one of examples 38 to 48, wherein the one or more priority rules for data packet prioritization are rules to apply a Quality of Service level to the data packet based on an application associated with the data payload.

In Example 50, the method of any one of examples 38 to 49, wherein the one or more priority rules for data packet prioritization are rules to apply a Quality of Service level to the data packet based on a data type of the data payload.

In Example 51, the method of any one of examples 38 to 12, wherein the one or more priority rules for data packet prioritization are rules to apply a Quality of Service level to the data packet based on a sender of the data payload.

In Example 52, the method of any one of examples 38 to 51, wherein the data packet is a data packet according to Internet Protocol (IP).

In Example 53, the method of any one of examples 38 to 52, further including receiving the signal representing the one or more priority rules from a wireless access point.

In Example 54, the method of any one of examples 38 to 53, further including receiving the signal representing the one or more priority rules from an Enterprise access controller.

In Example 55, the method of any one of examples 38 to 54, further including periodically sending a request signal representing a renewed request for the one or more priority rules.

In Example 56, the method of any one of examples 38 to 55, wherein determining the second priority tag includes assigning the data packet a priority that is greater than or less than a priority of one or more additional data packets.

While the disclosure has been particularly shown and described with reference to specific aspects, it should be understood by those skilled in the art that various changes in form and detail may be made therein without departing from the spirit and scope of the disclosure as defined by the appended claims. The scope of the disclosure is thus indicated by the appended claims and all changes, which come within the meaning and range of equivalency of the claims, are therefore intended to be embraced.

The invention claimed is:

1. A non-transitory computer readable medium, comprising instructions that, when executed, are configured to cause one or more processors to:
control a transmitter to send a first signal in response to a request for one or more priority rules for data packet prioritization;
receive a second signal based on the first signal, the second signal representing the one or more priority rules for data packet prioritization;
receive a third signal representing a data packet comprising a header and a data payload, wherein the header further comprises a first priority tag representing a first priority level;
determine from the data payload and the one or more priority rules for data packet prioritization a second priority tag representing a second priority level; and
replace the first priority tag with the second priority tag.

2. The non-transitory computer readable medium of claim 1, wherein the instructions, when executed, are further configured to cause the one or more processors to store the data packet with the second priority tag.

3. The non-transitory computer readable medium of claim 1, wherein the one or more priority rules for data packet prioritization include criteria to assign one of a plurality of priority levels to the data packet based on an attribute of the data payload.

4. The non-transitory computer readable medium of claim 1, wherein the one or more priority rules for data packet prioritization comprise one or more application-specific priority levels; and wherein determining the second priority tag comprises determining an application corresponding to the data packet and determining the second priority tag from the one or more application-specific priority levels based on the determined application.

5. The non-transitory computer readable medium of claim 1, wherein the one or more priority rules for data packet prioritization comprise one or more data-type-specific priority levels; and wherein determining the second priority tag comprises determining data type of the data payload and determining the second priority tag from the one or more data-type-specific priority levels based on the determined data type.

6. The non-transitory computer readable medium of claim 1, wherein the one or more priority rules for data packet prioritization comprise one or more sender-specific priority levels; and wherein determining the second priority tag comprises determining a sender of the data packet and determining the second priority tag from the one or more sender-specific priority levels based on the determined sender.

7. The non-transitory computer readable medium of claim 1, wherein the one or more priority rules for data packet prioritization comprise one or more destination-specific priority levels; and wherein determining the second priority tag comprises determining a destination of the data packet and determining the second priority tag from the one or more destination-specific priority levels based on the determined destination.

8. The non-transitory computer readable medium of claim 1, wherein the one or more priority rules for data packet prioritization comprise one or more IP-Address-specific priority levels; and wherein determining the second priority tag comprises determining an IP-Address from which the data packet was sent and determining the second priority tag from the one or more IP-Address-specific priority levels based on the determined IP-Address from which the data packet was sent.

9. The non-transitory computer readable medium of claim 1, wherein the one or more priority rules for data packet prioritization are rules to apply a Quality of Service level to the data packet, and wherein determining the second priority tag comprises selecting a Quality of Service identifier for the data packet according to the one or more priority rules for data packet prioritization.

10. The non-transitory computer readable medium of claim 1, wherein the instructions are further configured, when executed, to cause the one or more processors to receive the second signal representing the one or more priority rules from a wireless access point or an Enterprise access controller.

11. The non-transitory computer readable medium of claim 1, wherein the instructions are further configured, when executed, to cause the one or more processors to periodically send a request signal representing a renewed request for the one or more priority rules.

12. A user device, comprising one or more processors configured to:
control a transmitter to send a first signal representing a request for one or more priority rules for data packet prioritization;
receive a second signal in response to the first signal, the second signal representing the one or more priority rules for data packet prioritization;
receive a third signal representing a data packet comprising a header and a data payload,
wherein the header further comprises a first priority tag representing a first priority level;
determine from the data payload and the one or more priority rules for data packet prioritization a second priority tag representing a second priority level; and
replace the first priority tag with the second priority tag.

13. The user device of claim 12, wherein the one or more processors are further configured to store the data packet with the second priority tag.

14. The user device of claim 12, wherein the one or more priority rules for data packet prioritization include criteria to assign one of a plurality of priority levels to the data packet based on an attribute of the data payload.

15. The user device of claim 12, wherein the one or more priority rules for data packet prioritization comprise one or more application-specific priority levels; and wherein determining the second priority tag comprises determining an application corresponding to the data packet and determining the second priority tag from the one or more application-specific priority levels based on the determined application.

16. The user device of claim 12, wherein the one or more priority rules for data packet prioritization comprise one or more data-type-specific priority levels; and wherein determining the second priority tag comprises determining data type of the data payload and determining the second priority tag from the one or more data-type-specific priority levels based on the determined data type.

17. The user device of claim 12, wherein the one or more priority rules for data packet prioritization comprise one or more sender-specific priority levels; and wherein determining the second priority tag comprises determining a sender of the data packet and determining the second priority tag from the one or more sender-specific priority levels based on the determined sender.

18. The user device of claim 12, wherein the one or more priority rules for data packet prioritization comprise one or more IP-Address-specific priority levels; and wherein determining the second priority tag comprises determining an IP-Address from which the data packet was sent and determining the second priority tag from the one or more IP-Address-specific priority levels based on the determined IP-Address from which the data packet was sent.

* * * * *